United States Patent
Furuta

[11] 3,917,342
[45] Nov. 4, 1975

[54] VEHICLE SEAT AND SAFETY HARNESS ASSEMBLY

[75] Inventor: Tetuziro Furuta, Yokohama, Japan

[73] Assignee: Nissan Motor Company Limited, Yokohama, Japan

[22] Filed: Oct. 25, 1973

[21] Appl. No.: 409,680

[30] Foreign Application Priority Data
Oct. 26, 1972   Japan.............. 47-123774

[52] U.S. Cl................... 297/385; 248/429
[51] Int. Cl.² .......................... A62B 35/00
[58] Field of Search....... 297/216, 385; 280/150 SB; 248/424, 429, 361 R

[56] References Cited
UNITED STATES PATENTS

| | | | |
|---|---|---|---|
| 3,204,916 | 9/1965 | Pickels | 297/385 |
| 3,207,554 | 9/1965 | Dall | 297/385 |
| 3,288,422 | 11/1966 | Krause | 297/385 |
| 3,540,772 | 11/1970 | Weiler | 248/361 R |
| 3,572,832 | 3/1971 | Graham | 297/385 X |
| 3,727,977 | 4/1973 | Gminer | 297/385 |
| 3,734,562 | 5/1973 | Fourrey | 297/216 |
| 3,785,701 | 1/1974 | Gilmore | 297/385 |

*Primary Examiner*—James T. McCall

[57] ABSTRACT

An improved safety harness assembly which comprises a seat belt anchored to a lower portion of a vehicle seat and an upwardly elongated belt engaging member stationarily fixed to the other lower portion of the vehicle seat.

2 Claims, 6 Drawing Figures

VEHICLE SEAT AND SAFETY HARNESS ASSEMBLY

The present invention relates to an improvement to a safety harness assembly in which adjustment of the safety harness is not required when the fore-and-aft position of the seat is changed.

It is presently commonplace in aircraft, land vehicles and other power driven vehicles to provide some sort of restraining device for a seat occupant so that the occupant is protected from striking against the windshield, steering wheel or control column, instrument panel, or other structural part of the vehicle in case of a collision or excessive deceleration condition. A safety harness provides such restraint for an occupant and usually takes the form of a seat belt or a shoulder strap or a combination of the two by which a seat occupant subjected to sudden deceleration is restrained. As is well known, it is usual to incorporate such a safety harness with a vehicle seat.

A known safety harness of the type having a seat belt or a shoulder strap has been incorporated with a vehicle seat in such a manner that the seat belt or the shoulder strap is fixedly connected at one another portion thereof to a side sill of a vehicle body, and at another anchor portion thereof with a transmission tunnel. Alternatively, the seat belt or shoulder strap has been fixedly connected at both anchor portions to a frame structure of the seat, especially to a seat cushion frame on which a horizontal seat cushion is mounted, or a seat back frame on which an upright seat back is mounted. In the former manner, however, it is necessary to undesirably adjust the length of the seat belt or the shoulder strap because of the provision of a seat adjuster to adjust the fore-and-aft position of the seat. The seat adjuster is incorporated with the frame structure of the seat, resulting in a complicated safety harness. In the latter manner, the length of the seat belt or shoulder strap does not need to be adjusted, because the seat belt or shoulder strap moves together with the frame structure of the seat when the seat position is changed. However, the frame structure of the seat must bear the load exerted on the seat belt or shoulder strap in the event of a collision or excessive deceleration condition, tending to require the fame structure of the seat to be large and restrict the choice of materials. In addition, when an old seat belt or shoulder strap is replaced by a new one, it is necessary to undesirably disassemble not only the frame structure of the seat, but also the seat cushion and seat cover, resulting in an excessive amount of work.

Thus, the prior art vehicle seat arrangements having safety harnesses are inadequate and a serious problem remains to be solved, so that there is a need for an improved safety harness assembly having a seat belt and an upwardly elongated resilient member.

The present invention alleviates the disadvantages of the prior art mentioned above by fixedly connecting a seat belt at its anchor portions to a seat adjuster, especially to an upper moving guide rail or upper elongated sliding member thereof by a suitable fastening means.

It is, accordingly, an important object of the present invention to provide an improvement to a safety harness assembly for use with a motor vehicle seat, in which seat a frame structure thereof does not bear a load exerted on the seat belt assembly.

Another object of the present invention is to provide an improvement to a safety harness assembly for use with a motor vehicle seat which is simple in construction and economical to manufacture on a commercial production basis.

Still another object of the present invention is to provide an improvement to a safety harness assembly for use with a motor vehicle seat which is capable of prolonging the expected life spans of not only the frame structure of the seat but also a seat cushion and a seat cover.

A further object of the present invention is to provide an improvement to a vehicle seat assembly which can easily be effected with various existing safety harnesses of the type having a seat belt.

These and other objects and advantages of the present invention will become apparent from the following detailed description taken in conjunction with the accompanying drawings in which like reference numerals designate corresponding parts in all figures and in which.

Figure 1:
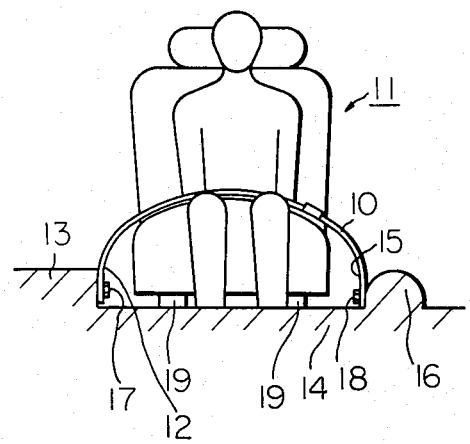
FIG. 1 is a frontal view of a prior art vehicle seat and safety harness assembly having a seat belt illustrating the seat belt as being connected at another portions thereof to a side sill and a transmission tunnel of a vehicle body.
Figure 2:
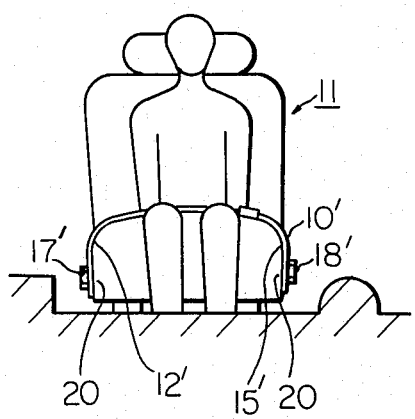
FIG. 2 is a frontal view of another prior art vehicle seat and safety harness assembly having a seat belt illustrating the seat belt as being connected at anchor portions thereof to a frame structure of the seat.

Referring now to the drawings and more particularly to FIG. 1, a prior art safety harness having a seat belt 10 is incorporated with a vehicle seat 11 in such a manner that the seat belt 10 is fixedly connected at one anchor portion 12 thereof to a side sill 13 of a vehicle floor 14, and at another anchor portion 15 to a transmission tunnel 16 by suitable fastening means 17 and 18 respectively. As described hereinbefore, it may be undesirably necessary to adjust the length of the seat belt 10 when the position of the seat 11 is changed by means of a seat adjuster 19. Another prior art safety harness having a seat belt 10' shown in FIG. 2 is incorporated with the vehicle seat 11 in such a manner that a seat belt 10' is fixedly connected at anchor portions 12' and 15' to a seat frame structure such as a seat cushion frame 20 by suitable fastening means 17' and 18' respectively. Therefore, as described hereinbefore, the seat cushion frame 20 must bear a load exerted on the seat belt 10' in the event of a collision or excessive deceleration condition so that the seat cushion frame 20 must be large in size and restricted in the choice of materials employed. In order to avoid these disadvantages, an improvement to a safety harness assembly having a seat belt and an upwardly elongated resilient member in accordance with the present invention is provided.

Figure 3:
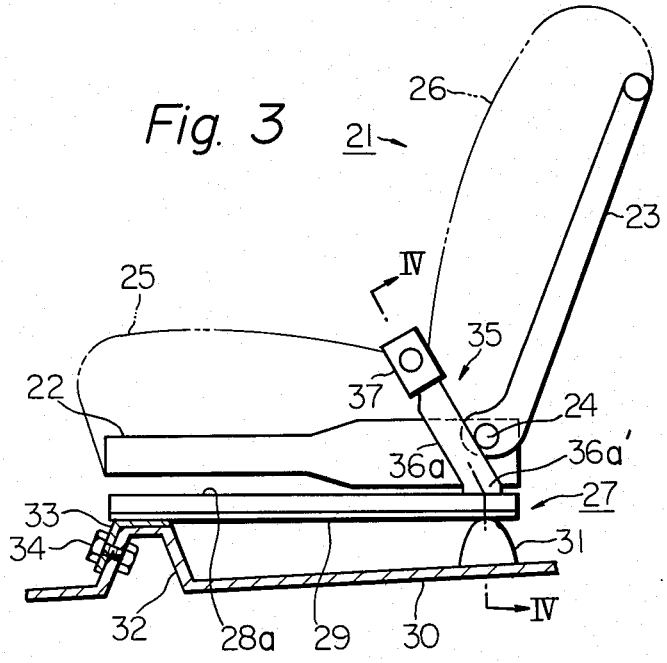
FIG. 3 is a side view of a preferred embodiment of a safety harness assembly having an upwardly elongated resilient member in accordance with the improvement of the present invention.

Reference is now made to FIG. 3 which illustrates a preferred embodiment of the improvement to a a safety harness assembly having a seat belt and an upwardly elongated resilient member according to the present invention. A vehicle seat generally designated by a reference numeral 21 comprises a seat frame structure (no numeral) having a seat cushion frame 22 and a seat back frame 23 which is pivotally connected to the seat cushion frame 22 by a shaft 24. A horizontal seat cushion 25 is mounted on the seat cushion frame 22, while an upright seat back 26 is mounted on the seat back frame 23. The vehicle seat 21 is provided with a seat adjuster which is generally indicated by a reference numeral 27 and which comprises a pair of upper guide rails 28 fixedly connected to the seat cushion frame 22 and a pair of lower guide rails 29 fixedly connected to a floor 30 by a bracket 31 and to a cross member 32 of the floor 30 by a flange 33 which is connected to the cross member 32 by a suitable fastening means 34. The upper guide rails 28 slide on the lower guide rails 29 when the fore-and-aft seat position is adjusted by the seat adjuster 27. A reference numeral 35 generally designates a safety harness assembly which has a seat belt 36a and an upwardly elongated resilient member 36 with a buckle 37. As shown, anchor portions 36' and 36'a of the seat belt assembly 35 are fixedly connected to the upper guide rails 28 and 28a of the seat adjuster 27 so that the safety harness assembly 35 moves together with the upper guide rails 28 and 28a when the seat position is changed.

Figure 4:
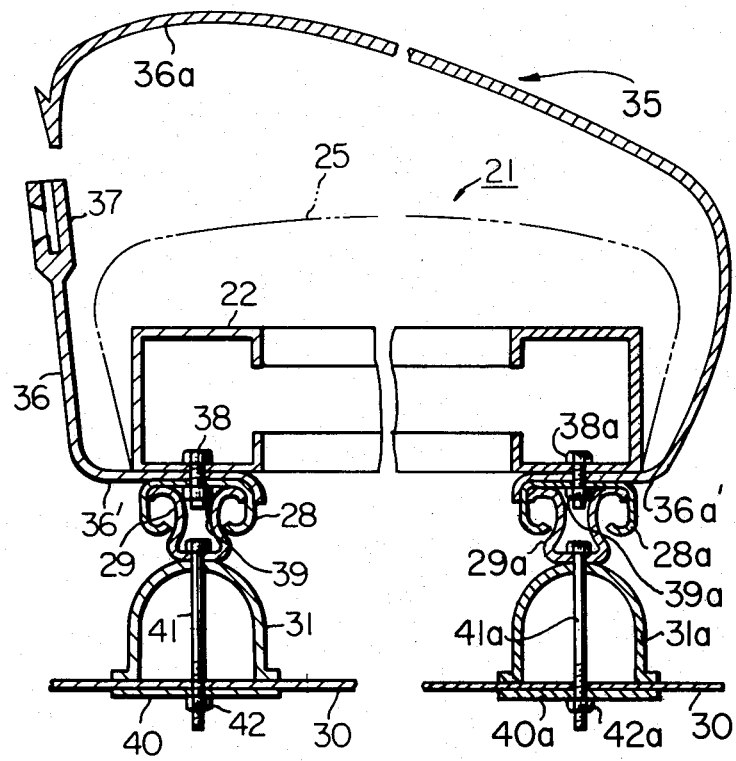
FIG. 4 is an enlarged sectional view taken on a line IV—IV of FIG. 3 showing the detailed construction of the vehicle seat and the safety harness assembly shown in FIG. 3.

The more detailed configuration of the vehicle seat arrangement, particularly relating to the relationship between the seat adjuster 27 and the anchor portions 36' 36a' of the safety harness assembly 35, will become apparent from FIG. 4, in which the anchor portions 36'36a' of the safety harness assembly 35 are fixedly connected to the upper guide rails 28 and 28a by suitable fastening means, in this case, bolts 38, 38a and nuts 39, 39a. The lower guide rails 29, 29a are shown as mounted on the brackets 31, 31a which are connected to the floor 30 by welding. The floor 30 is provided with a reinforcing panels 40, 40a. The lower guide rails 29, 29a are fixed to the bracket 31, 31a by means of bolts 41, 41a and nuts 42, 42a.

Figure 5:
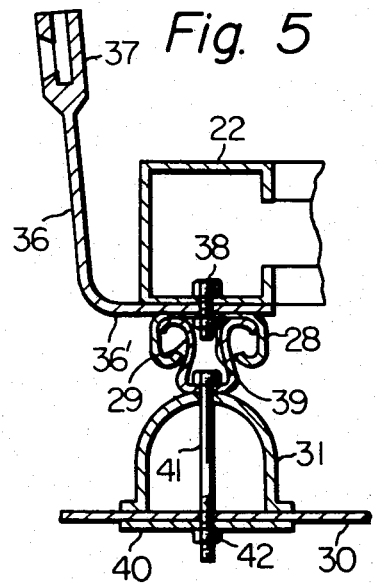
FIG. 5 is an enlarged sectional view of a modified form of the safety harness assembly shown in FIG. 4.

FIG. 5 illustrates a modified form of the embodiment of the safety harness assembly shown in FIGS. 3 and 4. This modification is essentially similar to the arrangement of FIGS. 3 and 4 except that the anchor portions 36' of the seat belt 36 are fixedly connected to the upper guide rails 28 by welding.

Figure 6:
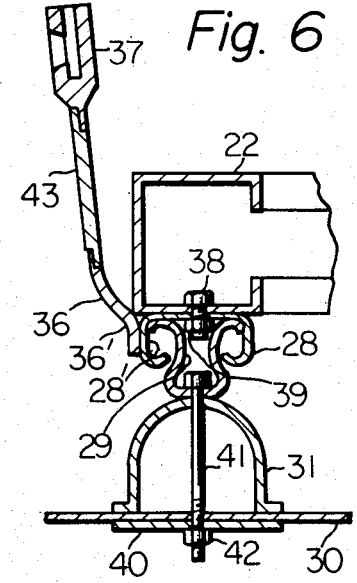
FIG. 6 is an enlarged sectional view of another modified form of the safety harness assembly showin in FIG. 4.

On the other hand, FIG. 6 illustrates another modified form of the safety harness assembly shown in FIG. 3. In this modification, the anchor portions 36' of the upwardly elongated resilient member 36 is fixedly connected to side portion 28' of the upper guide rail 28 by welding. Additionally, the upwardly elongated resilient member 36 includes an intermediate member 43 which is made of an elastic material in order to absorb shock during a collision or deceleration condition of the vehicle. The other elements in this modification are similar to the corresponding parts used in the embodiment shown in FIGS. 3 and 4, so that a detailed explanation thereof can be omitted.

The herein presented detailed description of the preferred embodiment of the present invention is for the purpose of explaining the principles thereof only, and is not to be considered as limiting or restricting the present invention, since many modifications may be made by exercise of skill in the art without departing from the scope of the present invention.

What is claimed is:

1. In a safety harness assembly for use with a vehicle seat including a seat portion and a seat back portion and carried by a seat adjuster constituted by a pair of guide rails fixedly mounted on a floor of the vehicle and a pair of elongated sliding members fixedly connected to the lower portion of said seat and slidably riding on said guide rails respectively, the improvement comprising:

a seat belt having one end firmly held between one of the seat portion frames and one of the sliding members,
an upwardly elongated resilient member having its lower end firmly held to the other sliding member, an intermediate member made of an elastic material and disposed between said lower end and a belt engaging portion of said resilient member, said resilient member lying adjacent one side of said seat portion and having substantially the same height as said seat portion, and
first and second connecting means for respectively connecting the one end of said seat belt to one of said sliding members and the lower end of said upwardly elongated resilient member to said other sliding member.

2. A safety harness assembly as claimed in claim 1, wherein said first connecting means is a bolt and nut.

* * * * *